US010719603B2

(12) United States Patent
Georgiev et al.

(10) Patent No.: US 10,719,603 B2
(45) **Date of Patent: *Jul. 21, 2020**

(54) METHODS AND APPARATUS FOR SANDBOXED CODE EXECUTION USING CONTAINERS

(71) Applicant: VMware, Inc., Palo Alto, CA (US)

(72) Inventors: Radostin Georgiev, Sofia (BG); Julian Vassev, Sofia (BG)

(73) Assignee: VMware, Inc., Palo Alto, CA (US)

( * ) Notice: Subject to any disclaimer, the term of this patent is extended or adjusted under 35 U.S.C. 154(b) by 91 days.

This patent is subject to a terminal disclaimer.

(21) Appl. No.: 15/980,038

(22) Filed: May 15, 2018

(65) Prior Publication Data

US 2018/0336344 A1 Nov. 22, 2018

Related U.S. Application Data

(60) Provisional application No. 62/506,941, filed on May 16, 2017.

(51) Int. Cl.
*G06F 11/00* (2006.01)
*G06F 21/53* (2013.01)
*G06F 8/71* (2018.01)
*G06F 9/455* (2018.01)

(52) U.S. Cl.
CPC ................ *G06F 21/53* (2013.01); *G06F 8/71* (2013.01); *G06F 9/455* (2013.01); *G06F 2221/034* (2013.01)

(58) Field of Classification Search
USPC ........................................................... 726/22
See application file for complete search history.

(56) References Cited

U.S. PATENT DOCUMENTS 7,836,303 B2 * 11/2010 Levy ...................... H04L 67/02 709/203
9,535,731 B2 * 1/2017 Ashley ................ G06F 9/45533
9,721,086 B2 * 8/2017 Shear ...................... G06F 21/45
9,992,217 B2 * 6/2018 Taylor ..................... H04L 67/22
10,013,557 B1 * 7/2018 Grafi ..................... G06F 21/566
10,067,798 B2 * 9/2018 Netto .................... G06F 9/5077
10,455,021 B2 * 10/2019 Collins .................. H04L 67/12
10,467,058 B2 * 11/2019 Venkataramanappa ..................... G06F 11/3409
2014/0040862 A1 * 2/2014 Webster .................... G06F 8/61 717/121
2016/0149950 A1 * 5/2016 Ashley ................ G06F 9/45533 726/23
2017/0192825 A1 * 7/2017 Biberman ............. G06F 9/5072
2017/0200009 A1 * 7/2017 Bertolet ................ G06F 21/575

* cited by examiner

*Primary Examiner* — Amare F Tabor
(74) *Attorney, Agent, or Firm* — Hanley Flight and Zimmerman, LLC

(57) ABSTRACT

Methods and apparatus are disclosed to provide a sandboxed code execution in a virtualized environment. An example apparatus includes a closure service to receive a request for execution of code. The example closure service is to generate a closure to trigger execution of the code within the apparatus. The example apparatus includes a container host to form a host environment for a container image. The example container image is to spawn, in response to the closure, a container to execute the code. The example container is to execute the code and keep code execution and result inside the container. Code execution and result inside the container do not affect operation of the apparatus.

21 Claims, 13 Drawing Sheets

300 320

| Ref. | CONTAINER ASSESSABLE DESCRIPTION | |
|---|---|---|
| | UNASSEMBLED PART | SOURCE (Docker) |
| 302 / 304 | Build file | Dockerfile |
| 302 / 306 | Base image reference | Dockerfile or 'docker history <image>' |
| 302 / 308 | Build arguments | Dockerfile or 'docker inspect <image>' |
| 302 / 310 | Layer files | Dockerfile 'ADD' instructions or 'docker export <image>' |
| 302 / 312 | Build environment values | Dockerfile or 'docker inspect <image>' |

| Ref. | CONTAINER ASSESSABLE DESCRIPTION | |
|---|---|---|
| | UNASSEMBLED PART | SOURCE (Docker) |
| 402 / 302 / 304 | Build file | Dockerfile |
| 402 / 302 / 306 | Base image reference | Dockerfile or 'docker history <image>' |
| 402 / 302 / 308 | Build arguments | Dockerfile or 'docker inspect <image>' |
| 402 / 302 / 310 | Layer files | Dockerfile 'ADD' instructions or 'docker export <image>' |
| 402 / 302 / 312 | Build environment values | Dockerfile or 'docker inspect <image>' |
| 402 / 404 / 406 | Creation arguments | 'docker inspect <image>' |
| 402 / 404 / 408 | Run arguments | '/var/lib/docker/containers/*/{*.json, hosts, *.conf}' |
| 402 / 404 / 410 | Host environment | Host system characteristics |

FIG. 4

METHODS AND APPARATUS FOR SANDBOXED CODE EXECUTION USING CONTAINERS

RELATED APPLICATION

This patent arises from a continuation of U.S. Provisional Application Ser. No. 62/506,941, which was filed on May 16, 2017. U.S. Provisional Application Ser. No. 62/506,941 is hereby incorporated herein by reference in its entirety. Priority to U.S. Provisional Application Ser. No. 62/506,941 is hereby claimed.

FIELD OF THE DISCLOSURE

This disclosure relates generally to virtual computing environments, and, more particularly, to methods and apparatus for sandboxed code execution using containers in a virtual computing environment.

BACKGROUND

In computing environments, a container is a virtual structure used to run an isolated instance of an application in a host environment. A container virtualizes at the operating system level by abstracting (e.g., isolating) an application from the operating system. For example, an application executing in a container is isolated from an application executing on the host operating system or in other containers.

In computer security, a sandbox is a security mechanism that separates or isolates executing programs. A sandbox can be used to execute untested or untrusted programs or code, possibly from unverified or untrusted third parties, suppliers, users and/or websites while insulating the host machine or operating system from harm. For example, a sandbox can provide a tightly controlled set of computing resources in which a program can run. Network access, further access to the host machine, and access to input devices can be prohibited or heavily restricted.

BRIEF DESCRIPTION OF THE DRAWINGS

FIGS. 3-4 are example container assessable descriptions to assemble containers.

Figure 1:
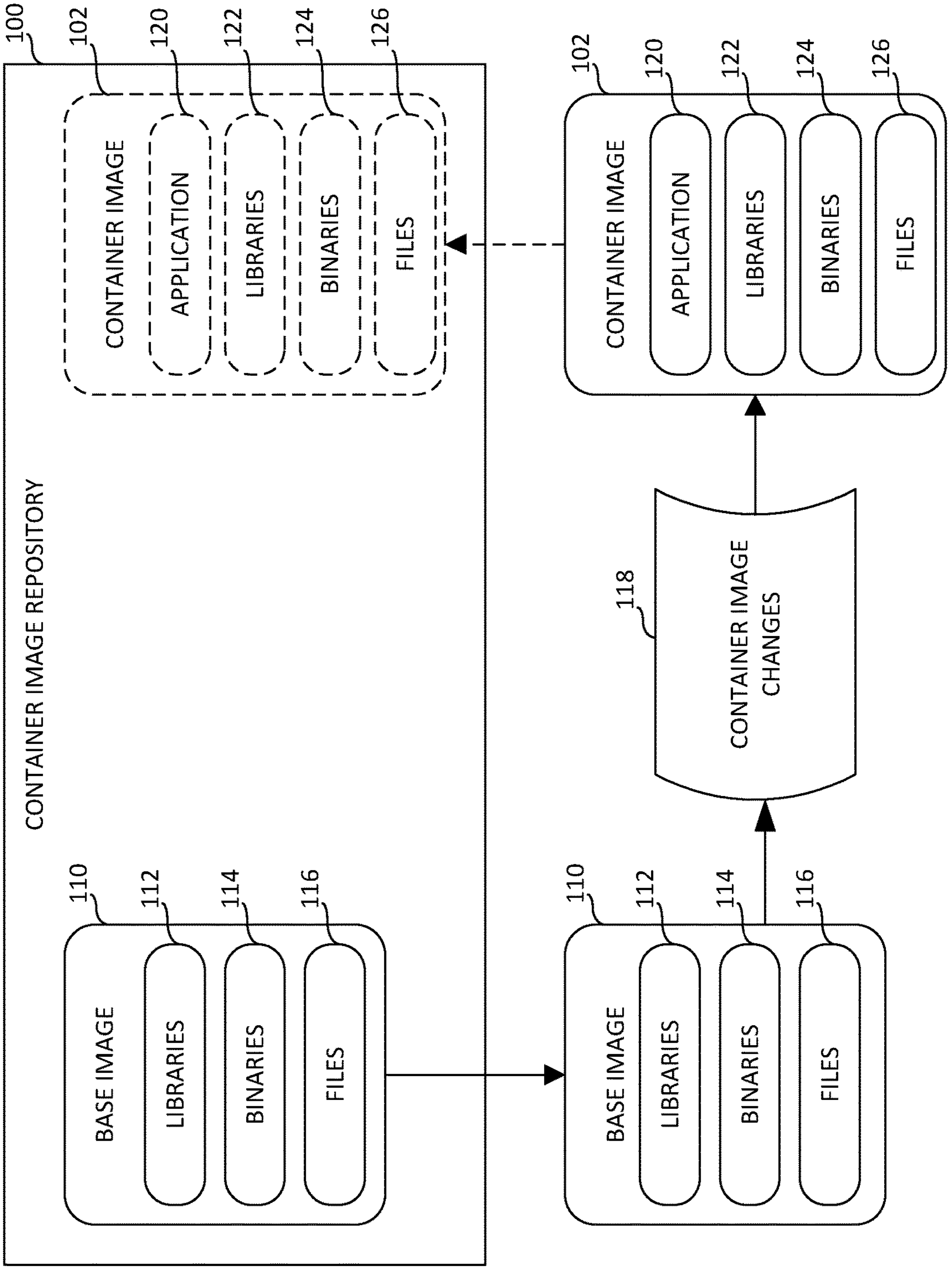
FIG. 1 is an example container image repository from which an example container image may be obtained and/or to which an example container image may be stored and/or published.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Virtualization technologies can be used for computing, storage, and/or networking, for example. Using virtualization, hardware computing resources and/or other physical resources can be replicated in software. One or more application programming interfaces (APIs) can be implemented to provide access to virtualized resources for users, applications, and/or systems while limiting or masking underlying software and/or hardware structure.

Cloud computing is based on the deployment of many physical resources across a network, virtualizing the physical resources into virtual resources, and provisioning the virtual resources to perform cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their entirety.

A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

In certain examples, a VM can host a container and/or a container can be implemented for virtualization in place of the VM. Containers (e.g., Docker®, Rocket™, Linux® containers (LXC), etc.) can be used in computing environments to run applications, programs, utilities, and/or any other software in isolation. Containers can be used to achieve improved resource management (e.g., resources used by containerized components are isolated for use only by those components that are part of the same container) and/or for security purposes (e.g., restricting access to containerized files or components). In addition, containers can also be used to achieve lightweight, reproducible application deployment. While a container is intended to run as a well-isolated instance of software in a host environment, the security properties of a container image and/or a container can impact operations of other resources and/or processes in a host computer environment in which the container executes.

Prior to running as a container in the host environment, the container is defined in a container image that specifies components such as an application along with any libraries, binaries and/or other files to execute the container in the host environment (e.g., a VM, etc.). In some examples, the specified components remain unassembled (e.g., they are not located together to form a container) until a time at which the container is to be executed. When a determination is made to execute the container in the host environment, the host environment uses the container image to assemble the previously unassembled parts specified in the container image for execution as a container. In certain examples, a platform as a service (PaaS) environment can host a plurality of containers and virtual applications (vApps).

Example Virtualization Environments

As described above, many different types of virtualization environments exist. Three example types of virtualization environment are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). In certain examples, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In an example paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated the process from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

Example Container Implementations

In certain examples, containers can be implemented from one or more container images stored in a container image repository. For example, as shown in FIG. 1, a developer can publish and/or store one or more container images 102 in a container image repository 100. A container image 102 is a snapshot of a container and produces a container when executed, for example. The example container image repository 100 can be implemented using a centralized computer architecture or a distributed computer architecture, for example.

The example container image repository 100 serves as a storage facility for container images, such as the example container image 102, and base images, such as an example base image 110. As used herein, "base" is a relative term. For example, a base image is a base relative to another container image that is built upon it. The base image, however, can itself be a container image that can be used to execute a corresponding container. In some examples, the base image 110 can be developed based on another container image serving as a base for the base image 110. In the illustrated example of FIG. 1, the base image 110 serves as an initial framework for the development of another container image, such as the example container image 102. For example, a developer can access the example base image 110 from the container image repository 100 if the developer elects to use the base image 110 as a starting point for developing another container image. The example base image 110 specifies example libraries 112, example binaries 114, and example files 116 that the developer can use and/or modify by, for example, adding one or more executable programs and/or layers of additional libraries, binaries and/or files.

In the illustrated example, the base image 110 can be built onto and/or otherwise modified (e.g., by applying container image changes 118 to the base image 110) to build the example container image 102. The container image 102 of the illustrated example specifies an example application 120, example libraries 122, example binaries 124, and example files 126. For example, the libraries 122, the binaries 124, and the files 126 are used by the example application 120 during an execution phase. After the example container image 102 has been built, the developer can store and/or publish the container image 102 to the example container image repository 100 as shown in FIG. 1. The example container image repository 100 of FIG. 1 can include a number of container images and/or base images, including without limitation a single container image 102. In some examples, the example container image 102 stored in the example container image repository 100 is available to any number of developers who may access the container image 102 from the container image repository 100. In this regard, the example container image 102 is mobile code that can be built upon and/or otherwise modified by any developer and/or other entity having access to the example container image 102.

As discussed above, a base image is an initial framework specifying basic components that a developer may use to develop other container images. In examples disclosed herein, an intermediate container image is an intermediate framework specifying components that have been built upon and/or otherwise modified in relation to the components of a base image. The components of an intermediate container image differ in some respect from those of a final container image. Thus, an intermediate container image is a base relative to a final container image. In examples disclosed herein, a final container image specifies the components that have been built upon and/or otherwise modified in relation to the components of a base image and any intermediate container images from which the final container image was developed. The components of a final container image are to be used to execute a corresponding container in a host environment, for example.

Figure 2:
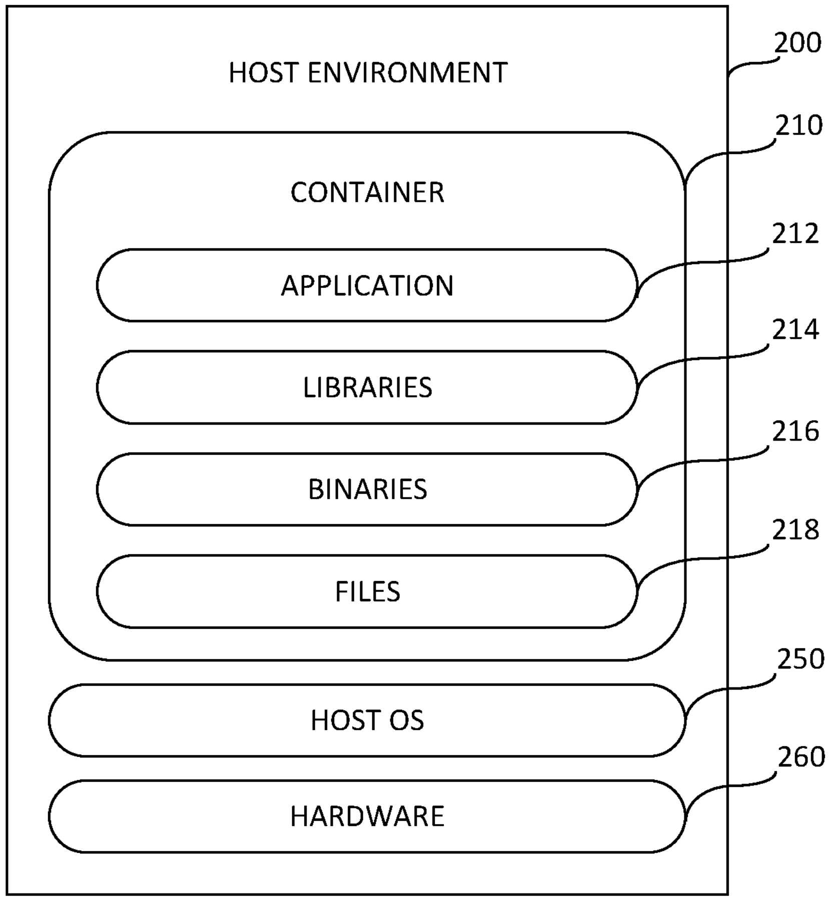
FIG. 2 is an example container running in an example host environment.

FIG. 2 depicts an example container 210 running in an example host environment 200 during an example execution phase. The example host environment 200 can be implemented using, for example, a server, a personal computer, a mobile phone (e.g., a cell phone, a smart phone), a tablet computer, or any other type of computing device. The example container 210 includes an application 212, one or more libraries 214, one or more binaries 216, one or more files 218, etc.

The example host environment 200 includes an example host operating system (OS) 250 and example hardware 260 associated with the host environment 200. The example host OS 250 can be Linux®, Microsoft Windows® or Apple OS X®. In the illustrated example, the hardware 260 includes the example processing platform 1300 of FIG. 13 and platform 1400 of FIG. 14.

In the illustrated example, when an execution decision system receives a request to execute a container in the host environment 200 based on the container image 102, the example container 210 is generated by assembling the previously unassembled parts specified in the example container image 102 of FIG. 1. After generating the container 210, an example execution decision system determines whether the container 210 meets the policy requirements for execution, such as security and/or other isolation/restriction requirements, etc. For example, meeting the policy requirements can be used as an indicator of whether it is safe to execute the container 210.

FIGS. 3-4 provide example container assembly descriptions 300, 400 to be assembled as container(s) 210 in the host environment 200. For example, a container assembler obtains and/or receives the example container image 102 from the container image repository 100 and/or from any other suitable source. One or more unassembled parts specified by the example container image 102 can be identified. As used herein, "unassembled part" refers to any one of the pieces, components, parameters, sections and/or elements that make up, form and/or are referenced by a container image. For example, the container image 102 specifies one or more parts that are to be assembled to form a container for execution. An "unassembled part" refers to a part that is not yet combined or assembled with other parts to make a container. For example, since a container image is a plan or scheme for assembling parts to form a container, parts specified in the container image may remain as "unassembled parts" until time for execution. The unassembled parts specified in the container image 102 may include, for example, a build file, a base image reference, a build argument, a layer file, a build environment value, a creation argument, a run argument, or a host environment value. As used herein, "build file" refers to any file containing instructions that direct how a container system (e.g., Docker®) builds and/or constructs an image (e.g., the example container image 102). As used herein, "base image reference" refers to a reference in a build file to the next image in the stack of images that will ultimately be assembled into a container by a run command. As used herein, "build argument" refers to any argument (e.g., a command line argument) applied by and/or to the container system as it builds and/or constructs an image. As used herein "layer file" refers to any of the contents of files and directories included in an image during image building. As used herein, "build environment value" refers to any parameters (e.g., UNIX® environment values) to the container system as it builds and/or constructs an image. As used herein "run argument" refers to any argument that directs the container system how to assemble and execute a container and identifies the resources to which the container will have access. As used herein, "creation argument" refers to a run argument that assembles a container but does not execute the assembled container. As used herein, "host environment value" refers to any parameters that the container system obtains from the host environment.

After unassembled parts specified in the example container image 102 have been identified, an example container assembly description can be created for the example container image 102. Example container assembly descriptions 300, 400 are illustrated in FIGS. 3-4. Referring to FIG. 3, the example container assessable description 300 includes an identification of the unassembled parts 302 that are specified in the example container image 102. In the illustrated example of FIG. 3, the unassembled parts 302 include an example build file 304, an example base image reference 306, example build arguments 308, example layer files 310 and example build environment values 312. While the example container assessable description 300 includes a specific number and type of unassembled parts 302, the example container assessable description 300 may include any number and/or any type of unassembled parts 302. In the illustrated example, the example container assessable description 300 includes a source identification 320 that identifies a source of each unassembled part 302. With respect to the unassembled parts 302 associated with the container image 102, the source identification 320 for the example build file 304 is "Dockerfile," the source identification 320 for the example base image reference 306 is "Dockerfile or 'docker history <image>,'" the source identification 320 for the example build arguments 308 is "Dockerfile or 'docker inspect <image>,'" the source identification 320 for the example layer files 310 is "Dockerfile 'ADD' instructions or 'docker export <images>,'" and the source identification 320 for the example build environment values 312 is "Dockerfile or 'docker inspect <image>.'"

An alternate example container assessable description 400 that may be created and/or assembled is illustrated in FIG. 4. In the illustrated example of FIG. 4, the container assessable description 400 includes an identification of the unassembled parts 402 identified or detected as being specified in the example container image 102. The example container assessable description 400 of FIG. 4 is similar to the example container assessable description 300 of FIG. 3 described above in that both include the unassembled parts including the example build file 304, the example base image reference 306, example build arguments 308, example layer files 310 and example build environment values 312. The example container assessable description 400 of FIG. 4 differs from the example container assessable description 300 of FIG. 3 described above in that the container assessable description 400 of FIG. 4 includes additional unassembled parts 404 including creation arguments 406, run arguments 408 and host environment values 410. With respect to the unassembled parts 402 of FIG. 4 associated with the container image 102, the source identification 320 for the example creation arguments 406 is "'docker inspect <image>,'" the source identification 320 for the example run arguments 408 is "'/var/lib/docker/containers/*/{*.json, hosts, *.conf}'" and the source identification 320 for the example host environment values 410 is "host system characteristics."

In the illustrated example of FIG. 4, unlike the build file 304, the base image reference 306, the build arguments 308, the layer files 310 and the build environment values 312, which are available from the example container image 102 before an execution phase, the creation arguments 406, run arguments 408 and host environment values 410 are unavailable before the execution phase because a security assessment may be unaware of the runtime characteristics associated with executing a container in the host environment 200 (e.g., the example container 210 executing in the example host environment 200 as shown in FIG. 2). Accordingly, the example container assessable description 400 further identifies the example unassembled parts 402 as example pre-execution phase parts 302 and example execution phase parts 404. As used herein, "pre-execution phase part" refers to an unassembled part of a container image (e.g., the container image 102) having one or more properties and/or characteristics that is/are assessable relative to one or more rules of an assessment policy outside of a host environment (e.g., the host environment 200) in which the container image is assembled for execution as a container. As used herein, "execution phase part" refers to an unassembled part of a container image (e.g., the container image 102) having one or more properties and/or characteristics that is/are not assessable relative to one or more rules of the assessment policy outside of a host environment (e.g., the host environment 200) in which the container image is assembled for execution as a container. While the illustrated example of FIG. 4 shows a container assessable description 400 having a specific number of pre-execution phase parts 302 and a specific number of execution phase parts 404, the container assessable description 400 may include any number of pre-execution phase parts 302 and/or execution phase parts 404.

In certain examples, the container 210 can be used to execute lightweight code snippets and/or script code in a cloud or cloud-like computing environment. The container 210 provides an ability to run certain tasks on request (e.g., on demand) triggered by a cloud event and/or on an ongoing basis provides flexibility and easier cloud management.

However, a problem with executing automation or configuration code as part of an automation workflow is that the execution environment is not isolated. If the execution environment is not isolated, then the execution environment and all of its associated dependencies must be properly set up. Moreover, any failure in the automation code snippets or scripts can directly affect the execution context in which the code is being executed. The execution context can be an automation application and/or other application that runs such a code. Further, such code run failures can affect the computing infrastructure itself. Many other applications use that infrastructure for processing resources (e.g., central processing unit, general processing unit, graphics processing unit, etc.), memory, and/or storage access, etc.

Thus, certain examples provide a scalable, lightweight service that can run relatively small, single purpose script functions or code snippets in an isolated, asynchronous manner and populate the results of the code execution so that the results can be retrieved later.

Certain examples include a Representational State Transfer (REST) service(s) that provide a mechanism to submit source code and later trigger execution of that source code in a container 210 on a configured container host 200. Clients of the REST services provide inputs for source code to be executed and later fetch the populated results. On an execution start, a separate container is spawned, code is executed, and results are populated so that the results are available to be consumed via the REST services. The environment setup is prepared via the container images 102. The execution environment can be quite different from the environment in which the code snippet executions are triggered. Leveraging containers 210 (e.g., Docker containers, etc.) provides an isolation level for processing, memory, and storage access. In certain examples, code execution can occur on a different machine from the machine on which the code is called/triggered.

Figure 5:
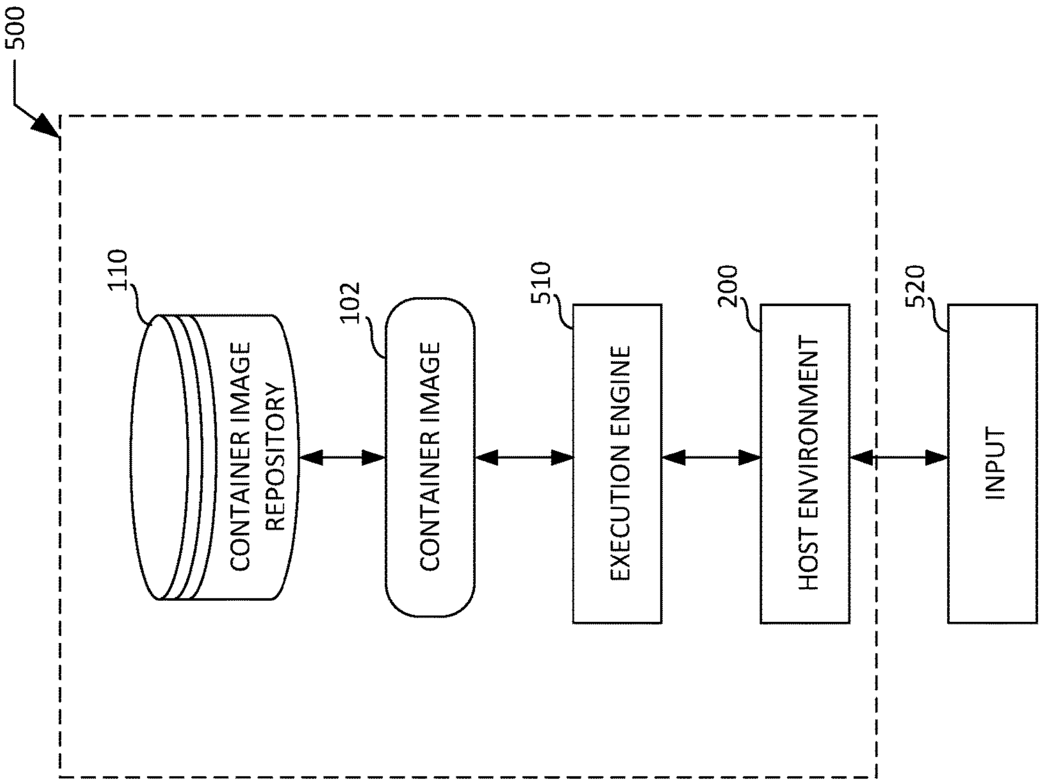
FIG. 5 illustrates an example system to facilitate container spawning for code execution.

FIG. 5 illustrates an example system 500 to facilitate container spawning for code execution. As shown in the example of FIG. 5, the example host environment 200 and/or the example execution engine 510 obtains and/or receives the example container image 102. The container image 102 may be obtained and/or received from any source, including without limitation from the example container image repository 110 described above. In the illustrated example, the previously unassembled parts 302, 404 of the container image 102 can be assembled (e.g., using the execution engine 510, etc.) to execute the container image 102 as a container 210 in the example host environment 200. The container 210 can be provided in the host environment 200 for code execution via an input 520. For example, the input 520 can provide an application programming interface (API) call, such as a REST API call, etc., a user interface input, a stimulus, and/or trigger to execute code in the container 210 in the host environment 200.

Figure 6:
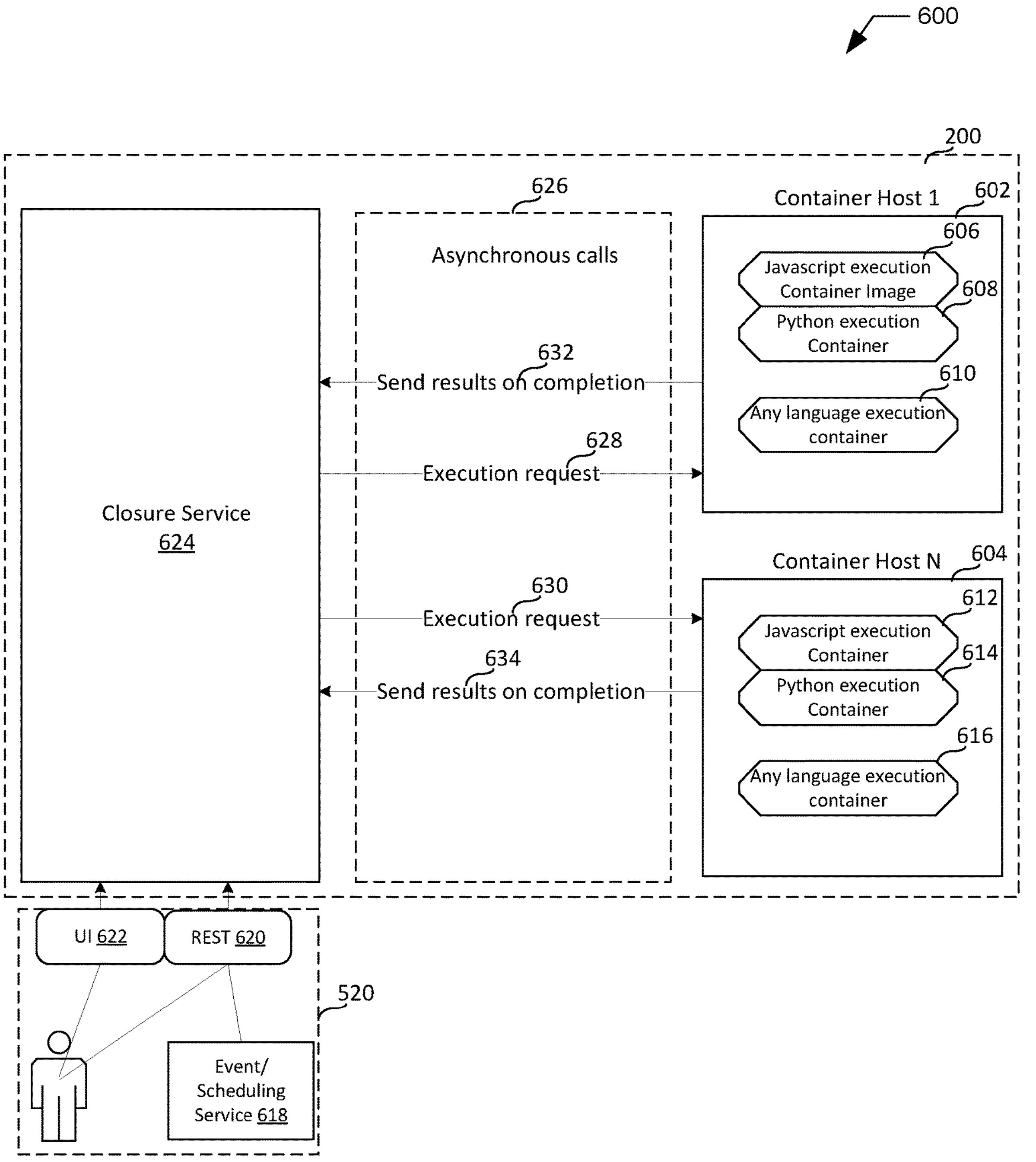
FIG. 6 illustrates an example system for sandboxed code execution via a container.

As shown in the example of FIG. 6, code can be executed in an isolated, enclosed, detached, or "sandboxed" fashion using containers such as the example container 210. In the illustrated example of FIG. 6, code snippets, scripts, etc., such as Java code, PowerShell™ script, Python code, etc., can be executed via the isolated environment of the container 210 without affecting the rest of the virtual environment. Using containers 210 running on one or more container host environments 200, code can execute without using a dedicated server.

As shown in the example of FIG. 6, the container hosts 1-N 602, 604 in the example host environment 200 include a plurality of containers 210 (e.g., container 606-616) of varying types for varying codes/languages (e.g., Javascript, Python, etc.). For example, the container host 602 includes a Javascript execution container 606, a Python execution container 608, other code execution container 610, etc. Thus, the container host 602 can be configured through its containers 606-610 to execute Javascript, Python, and/or other code, for example. Similarly, the container host 604 includes a Javascript execution container 612, a Python execution container 614, other code execution container 616, etc. Thus, the container host 604 can be configured through its containers 612-616 to execute Javascript, Python, and/or other code, for example.

The example input 520 of FIG. 6 includes an event/scheduling service 618 in communication with a REST service 620. The example input 520 can also include a user interface (UI) 622. The example REST Service 620 and UI 622 can interact with a closure service 624. The example closure service 624 encloses or encapsulates the requested functionality in a sandbox with the container 606-616 involved in code execution. For example, the closure service 624 prevents the requested functionality from executing or affecting code, settings, operation, etc., of the system outside the container 606-616 in which the functionality is to be executed. The example closure service 624 provides an outer or visible function defining the closure and an inner or hidden function facilitating code execution via the container 606-616, for example. Using the closure service 624 and container(s) 606-616 state variables, execution results, etc., can be hidden or isolated from a remainder of the virtualized system, for example. The example closure service 624 provides an environment via the container(s) 606-616 and control of the requested code execution, for example. The closure service 624 interacts with container hosts 602, 604 via one or more asynchronous calls or commands 626. Thus, the containers 606-616 can be triggered and configured asynchronously on demand. Further, errors in execution of the sandboxed code via the container(s) 606-616 are isolated and do not impact the rest of the system.

As shown in the example of FIG. 6, a user and/or software client, such as the event/scheduling service 618, requests a code execution by creating a closure 624 via the exposed REST API 620. The closure service 624 is instantiated with a closure state of CREATED, for example. The user/software client 618 triggers code execution by sending a REST call 620 and providing one or more input parameters, for example.

The closure service 624 checks if the target container host 602, 604 has the requested container image 102. If the container image 102 has not been prepared, the closure service 624 triggers container image preparation by either loading the container image 102 or building the container image 102 directly on the container host 602-604. Once image preparation is complete or the container image 102 has already been prepared, the closure service 624 sends a request 628, 630 to the container host 602, 604 to spawn a new container 606-616 using the container image 102. The container host 602, 604 provides a callback 632, 634 to the closure service 624, for example.

Then, the container 606-616 is spawned, and execution of small system code is triggered. The system code in the container 606-616 calls the closure 624 which changes its state to STARTED. The source codes and requested inputs are being fetched.

Once code and input(s) have been retrieved, the source code is executed in the container 606-616. Once code execution has been completed, the system code running inside the container(s) 606-616 populates execution results 632, 634 back to the closure service 624. The closure state then moves to FINISHED or FAILED, depending upon a successful or unsuccessful outcome of the container code execution. In certain examples, the closure service 624 can process and/or otherwise consume the container execution results and provide them to an external entity, such as the event/scheduling service 618, via the REST API 620.

In certain examples, the closure service 624 monitors a closure execution if the execution exceeds a predefined execution timeout. If the execution last longer than the configured timeout, the closure is cancelled and its state is moved to CANCELLED.

In certain examples, once the container 606-616 has completed its execution of code (e.g., after the closure execution, etc.), the container 606-616 is destroyed and/or otherwise removed so as to not clutter the container host 602-604 with stopped containers. In certain examples, a container image 102 can remain with the host 602-604 for subsequent container 606-616 spawning.

Thus, the example system configuration 600 of FIG. 6 illustrates a container setup for source code execution. The user and/or any software client sends a request to execute source code to the closure service 624 which is exposed via the REST API 620, for example. The closure service 624 talks to the container host 602, 604 where a container 606-616 is being spawned and the code is being executed. On completion of code execution, the results are populated back to the closure service 624 to be consumed later.

Figure 7:
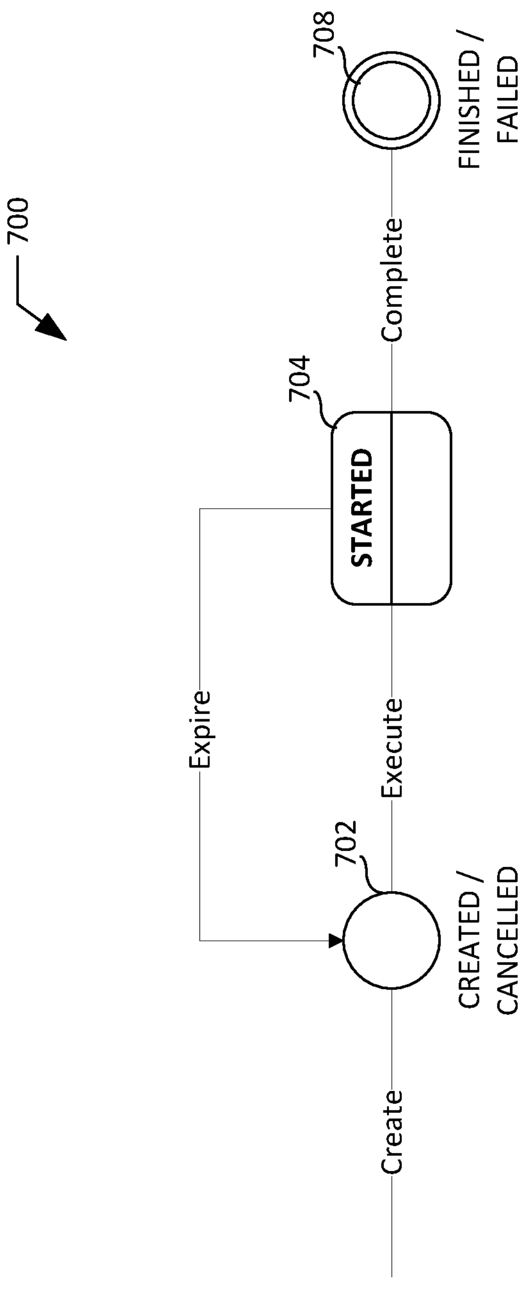
FIG. 7 depicts an example of various states and state transitions of an example closure.

FIG. 7 depicts an example of various states and state transitions 700 for an example closure driven by the closure service 624. At the beginning the state is CREATED 702. When closure execution is triggered, the state changes to STARTED 704. If the code execution takes more time than a predefined timeout, the state of the closure is switched to CANCELLED 702 automatically. When code execution completes, the closure can move to a FINISHED or a FAILED 708 state 708.

Figure 8:
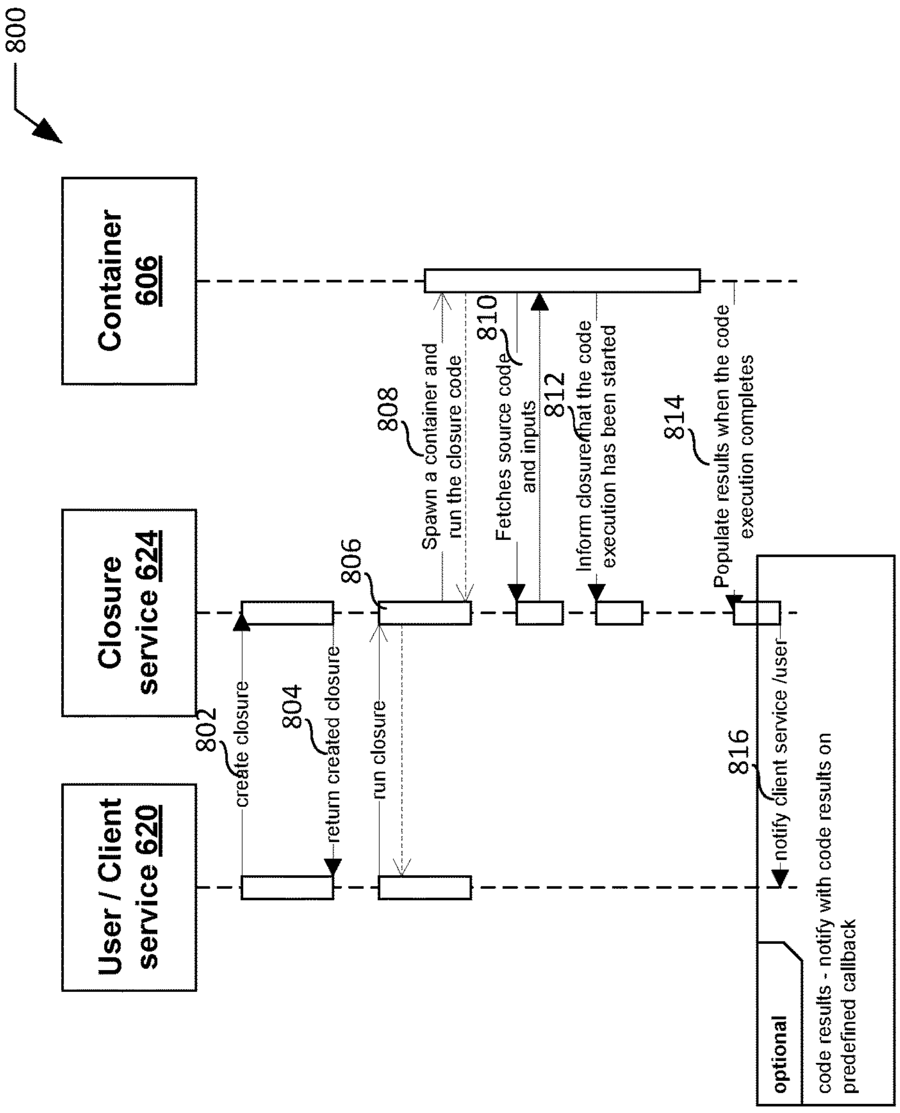
FIGS. 8-11 illustrate example sequence diagrams facilitating code execution via closure and container configuration.

FIG. 8 illustrates a closure execution as a sequence diagram 800. In the example of FIG. 8, source code is provided as part of the closure service 624, and, at the end of the execution, a predefined callback uniform resource indicator (URI) is being notified for code execution results. More specifically, at 802, closure creation is triggered via the closure service 624. At 804, the closure service 624 returns the closure to the requesting client service 620 (e.g., REST service 620 and/or associated event/scheduling service 618, etc.). The closure can be formed from a code snippet, script, etc., to be executed.

At 806, the closure is executed. Closure execution by the closure service 624 spawns a container 606 and triggers execution of closure code 808. The container 606 can fetch source code and inputs 810 and can inform the closure that code execution has started 812 via the container 606. When code execution is complete, results of that code execution can be populated 814 at the closure service 624. In certain examples, the closure service 624 notifies the client service 618, 620, 622, etc., with results of the code execution. For example, a predefined callback can be used to notify the service 618-622 of code results.

In certain examples, after the closure code execution, the container 606 in which the code has been executed is destroyed and/or otherwise removed so as to not clutter the container host 602 with stopped containers 606. In certain examples, a container image 102 can remain with the host 602 for subsequent container 606-610 spawning.

Figure 9:
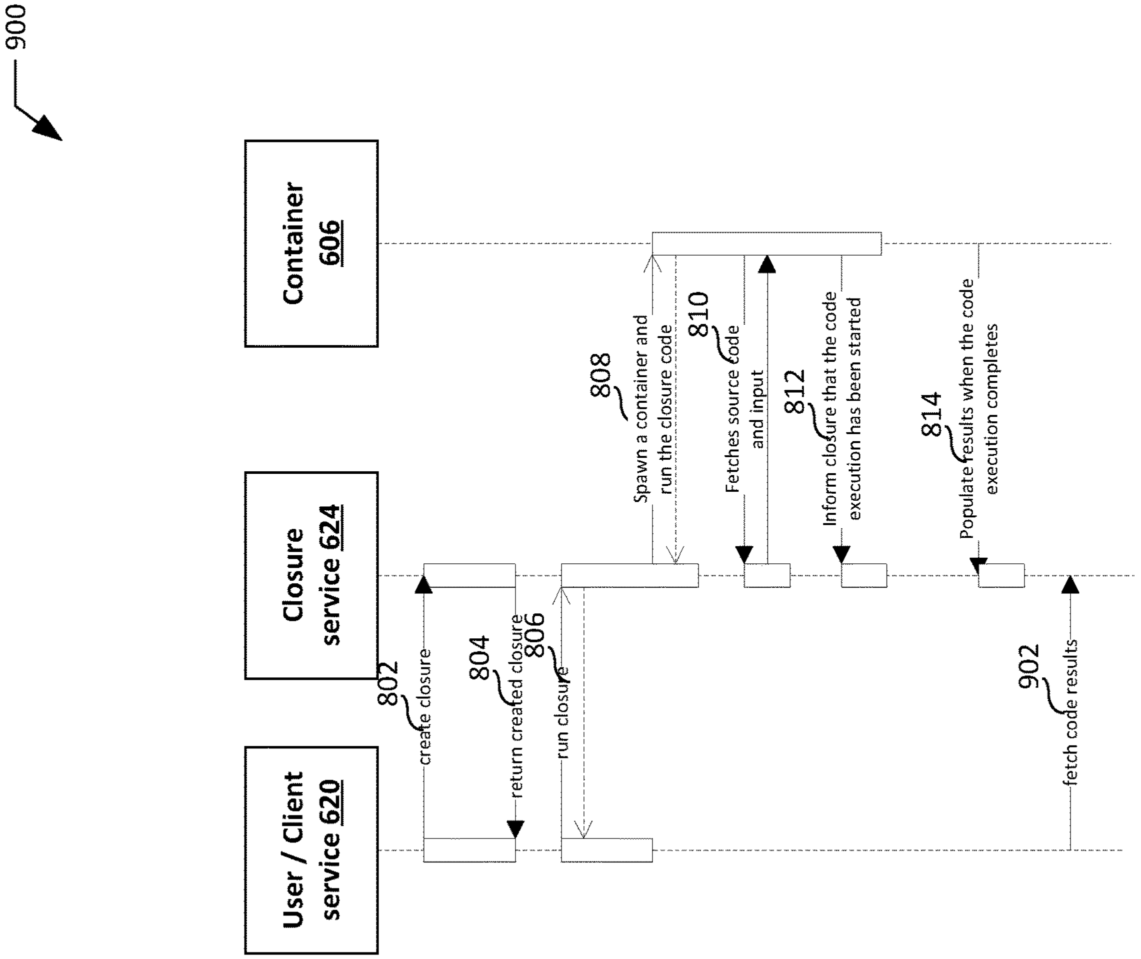

FIG. 9 is similar to the example of FIG. 8. However, in the example sequence 900 of FIG. 9, the user of software client 618-622 is responsible to fetch results of code execution after the execution has been triggered. As shown in the example of FIG. 9, at 802, closure creation is triggered via the closure service 624. At 804, the closure service 624 returns the closure to the requesting client service 620 (e.g., REST service 620 and/or associated event/scheduling service 618, etc.). The closure can be formed from a code snippet, script, etc., to be executed.

At 806, the closure is executed. Closure execution by the closure service 624 spawns a container 606 and triggers execution of closure code 808. The container 606 can fetch source code and inputs 810 and can inform the closure 624 that code execution has started 812 via the container 606. When code execution is complete, results of that code execution can be populated 814 at the closure service 624. At 902, the user/client service 620 fetches the code results of the execution from the closure service 624.

In certain examples, after the closure code execution, the container 606 in which the code has been executed is destroyed and/or otherwise removed so as to not clutter the container host 602 with stopped containers 606. In certain examples, a container image 102 can remain with the host 602 for subsequent container 606-610 spawning.

Figure 10:
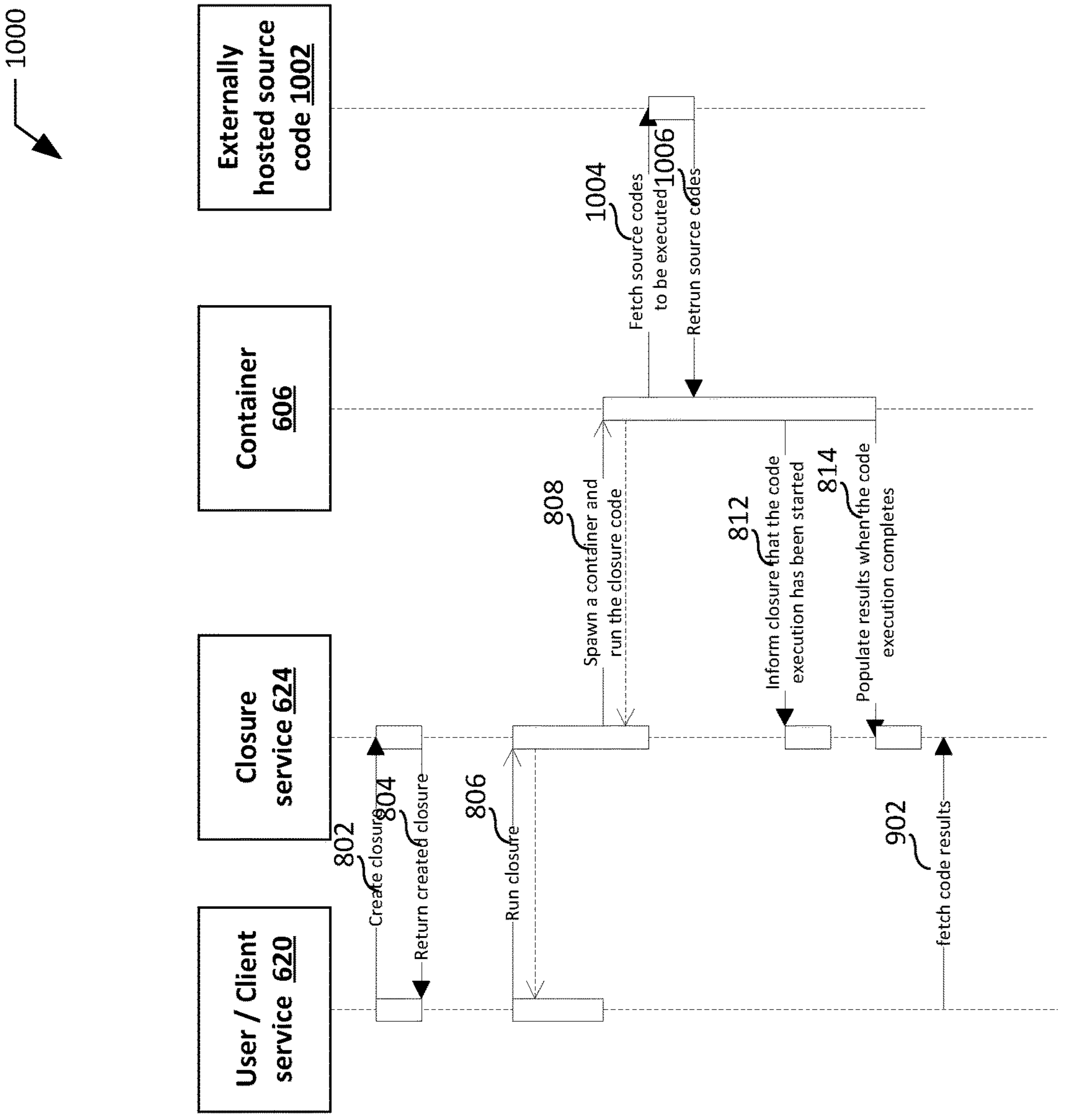

FIG. 10 illustrates an example data and/or message sequence diagram 1000 of a closure execution in which the source code is hosted differently from the closure service 624. Thus, the code is downloaded and executed in the example of FIG. 10. More particularly, at 802, closure creation is triggered via the closure service 624. At 804, the closure service 624 returns the closure to the requesting client service 620 (e.g., REST service 620 and/or associated event/scheduling service 618, etc.). The closure can be formed from a code snippet, script, etc., to be executed.

At 806, the closure is executed. Closure execution by the closure service 624 spawns a container 606 and triggers execution of closure code 808. The container 606 fetches source code and inputs 1004 from externally hosted source code 1002 and source codes can be returned 1006 from the external host 1002 to the container 606. The container 606 can inform the closure service 624 that code execution has started 812. When code execution is complete, results of that code execution can be populated 814 at the closure service 624. At 902, the user/client service 620 fetches the code results of the execution from the closure service 624.

In certain examples, after the closure code execution, the container 606 in which the code has been executed is destroyed and/or otherwise removed so as to not clutter the container host 602 with stopped containers 606. In certain examples, a container image 102 can remain with the host 602 for subsequent container 606-610 spawning.

Figure 11:
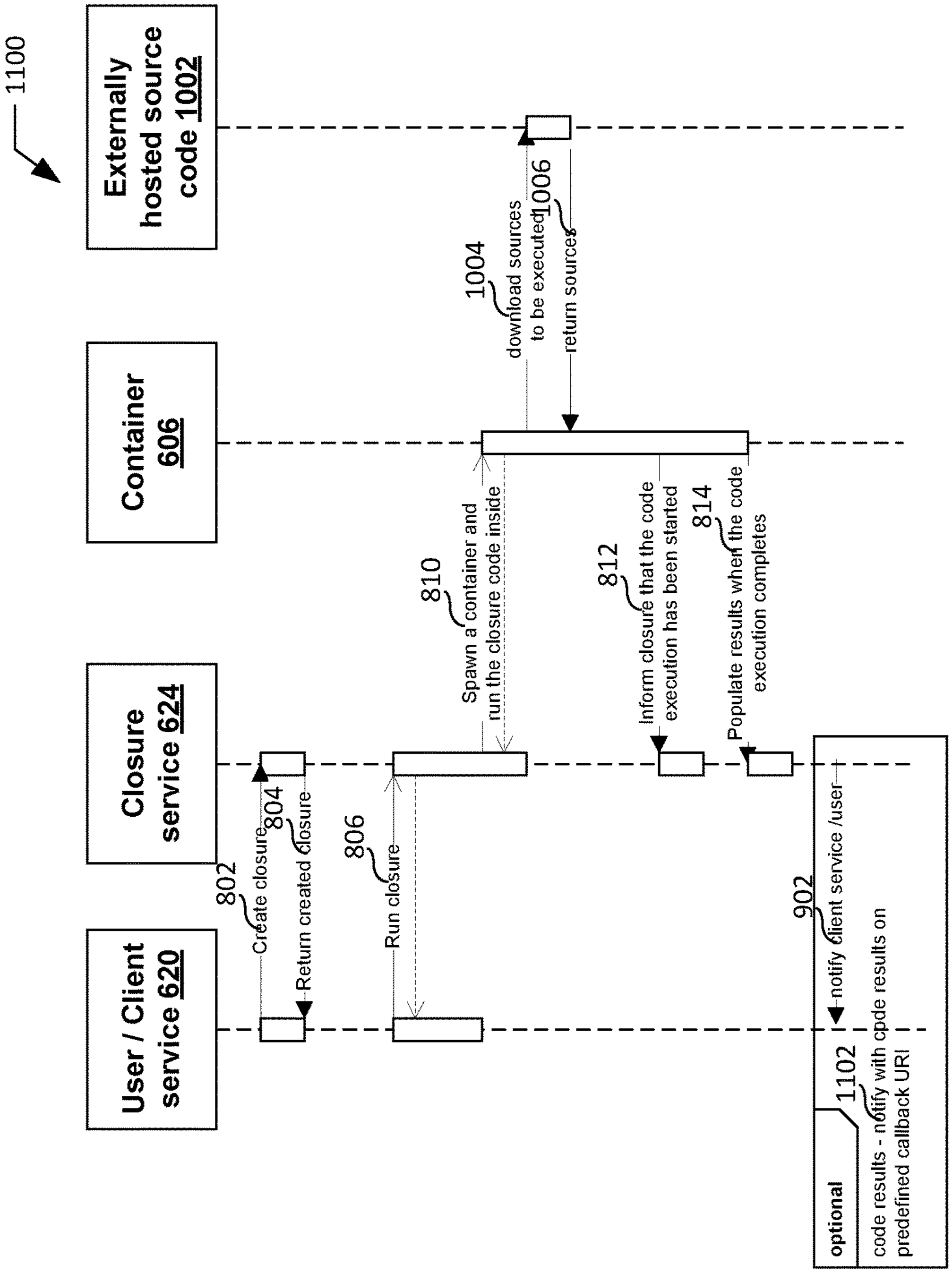

FIG. 11 illustrates an example sequence 1100 similar to the sequence 1000 of FIG. 10. However, at the end of execution, results are populated to a predefined callback URI. Thus, in the example of FIG. 11, at 802, closure creation is triggered via the closure service 624. At 804, the closure service 624 returns the closure to the requesting client service 620 (e.g., REST service 620 and/or associated event/scheduling service 618, etc.). The closure can be formed from a code snippet, script, etc., to be executed.

At 806, the closure is executed. Closure execution by the closure service 624 spawns a container 606 and triggers execution of closure code 808. The container 606 fetches source code and inputs 1004 from externally hosted source code 1002 and source codes can be returned 1006 from the external host 1002 to the container 606. The container 606 can inform the closure service 624 that code execution has started 812. When code execution is complete, results of that code execution can be populated 814 at the closure service 624. At 902, the user/client service 620 fetches the code results of the execution from the closure service 624. In certain examples, results can be generated in a predefined callback URI including code results and notification, for example.

In certain examples, after the closure code execution, the container 606 in which the code has been executed is destroyed and/or otherwise removed so as to not clutter the container host 602 with stopped containers 606. In certain examples, a container image 102 can remain with the host 602 for subsequent container 606-610 spawning.

While an example manner of implementing the example container image repository 100, container image 102, host environment 200, container 210, execution engine 510, input 520, event/scheduling service 618, REST service 620, UI 622, closure service 624, container hosts 602, 604, containers 606-616, and/or, more generally, the example systems and sequences is illustrated in FIGS. 1-11, one or more of the elements, processes and/or devices illustrated in FIGS. 1-11 may be combined, divided, re-arranged, omitted, eliminated and/or implemented in any other way. Further, the example container image repository 100, container image 102, host environment 200, container 210, execution engine 510, input 520, event/scheduling service 618, REST service 620, UI 622, closure service 624, container hosts 602, 604, containers 606-616, and/or, more generally, the example systems and sequences of FIGS. 1-11 may be implemented by hardware, software, firmware and/or any combination of hardware, software and/or firmware. Thus, for example, any of the example container image repository 100, container image 102, host environment 200, container 210, execution engine 510, input 520, event/scheduling service 618, REST service 620, UI 622, closure service 624, container hosts 602, 604, containers 606-616, and/or, more generally, the example systems and sequences of FIGS. 1-11 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example container image repository 100, container image 102, host environment 200, container 210, execution engine 510, input 520, event/scheduling service 618, REST service 620, UI 622, closure service 624, container hosts 602, 604, containers 606-616, and/or, more generally, the example systems and sequences of FIGS. 1-11 is/are hereby expressly defined to include a tangible computer readable storage device or storage disk such as a memory, a digital versatile disk (DVD), a compact disk (CD), a Blu-ray disk, etc.

storing the software and/or firmware. Further still, the example systems and/or sequences of FIGS. 1-11 may include one or more elements, processes and/or devices in addition to, or instead of, those illustrated in FIGS. 1-11, and/or may include more than one of any or all of the illustrated elements, processes and devices.

Figure 12:
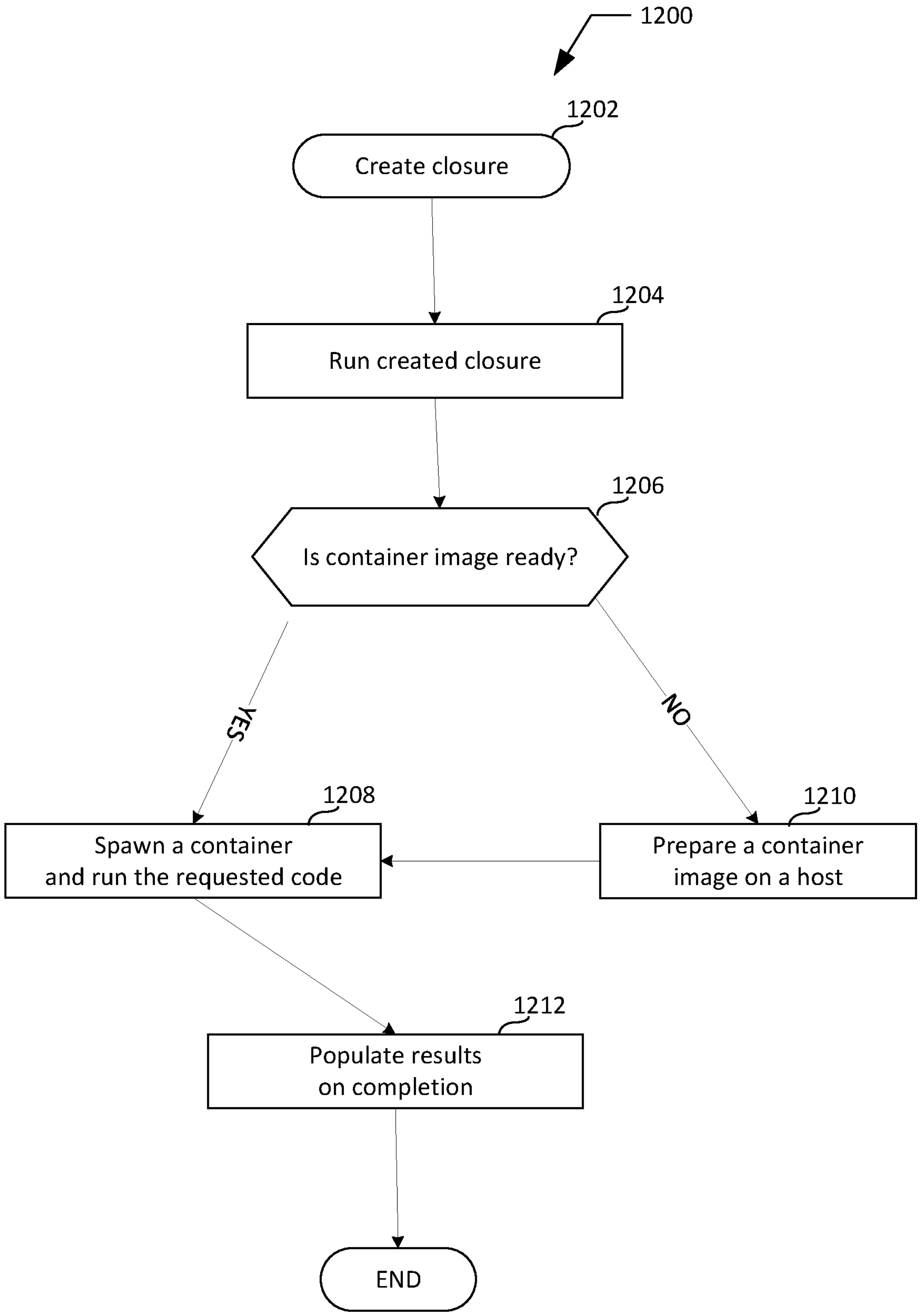
FIG. 12 is a flowchart representative of example machine-readable instructions that may be executed to implement the example systems and sequences of FIGS. 1-11 to facilitate sandboxed code execution via containers.

A flowchart representative of example machine-readable instructions for implementing sandboxed code execution via containers of FIGS. 1-11 is shown in FIG. 12. In this example, the machine-readable instructions include one or more program(s) for execution by a processor such as the processor 1312 shown in the example processor platform 1300 discussed below in connection with FIG. 13 and/or the processor 1412 shown in the example processor platform 1400 discussed below in connection with FIG. 14. The one or more program(s) may be embodied in software stored on a tangible computer readable storage medium such as a CD-ROM, a floppy disk, a hard drive, a digital versatile disk (DVD), a Blu-ray disk, or a memory associated with the processor 1312, 1412, but the entire program(s) and/or parts thereof could alternatively be executed by a device other than the processor 1312, 1412 and/or embodied in firmware or dedicated hardware. Further, although the example program(s) is/are described with reference to the flowchart illustrated in FIG. 12, many other methods of implementing the example systems and sequences of FIGS. 1-11 may alternatively be used. For example, the order of execution of the blocks may be changed, and/or some of the blocks described may be changed, eliminated, or combined.

As mentioned above, the example process(es) of FIG. 12 may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process(es) of FIG. 12 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 12 is a flowchart representative of example machine-readable instructions 1100 that may be executed to implement the example systems and sequences of FIGS. 1-11 to facilitate sandboxed code execution via container(s) in a virtualized environment. The example program 1200 begins at block 1202 when a closure is created. For example, as described above with respect to FIGS. 8-11, closure creation can be triggered by the closure service 624 based on input from the REST service 620, UI 622, etc. The closure service 624 returns the closure to the requesting client service 620 (e.g., REST service 620 and/or associated event/scheduling service 618, etc.). The closure can be formed from a code snippet, script, etc., to be executed.

At block 1204, the closure is executed. For example, closure code can be executed to create and configure a container 606-616 for sandboxed code execution.

At block 1206, the container image 102 is evaluated. For example, a presence or absence of the container image 102 at the container host 602, 604 is determined. If the container image 102 is ready, then, at block 1208, closure execution by the closure service 624 spawns a container 606-616 and triggers execution of requested sandboxed source code. Source code can be provided via the input 520, retrieved by the container 606-616, provided by an external host 1002, etc.

If the container image 102 is not ready, then, at block 1210, a container image 102 is prepared on the container host 602, 604. Container(s) 606-616 can then be spawned from the container image 102 at block 1208.

At block 1212, when sandboxed code execution is complete, results of that code execution can be populated at the closure service 624. Results can be fetched by the user/client service 620, closure service 624, etc. In certain examples, results can be generated in a predefined callback URI including code result(s) and other notification(s), for example.

Thus, as described above in connection with FIG. 12, on a source code execution request, the closure service 624 checks whether a container image 102 has already been prepared. If the container image 102, is ready, the image 102 is used to spawn a new container 606-616. The container(s) 606-616 runs requested code inside (e.g., in an isolated, sandbox environment) and populates a result back to the closure service 624. However, if the container image 102 is not ready, the closure service 624 first prepares the container image 102 by loading or building directly on the container host 602, 604 and then spawns a new container(s) 606-616 to execute the requested source code in sandbox mode, for example.

The example program of FIG. 12 ends after the results of sandboxed code execution via container(s) 606-616 in the container host(s) 602, 604 have been completed. In certain examples, the container(s) 606-616 in which the sandboxed code has been executed can be discarded after the sandboxed execution has ended.

Figure 13:
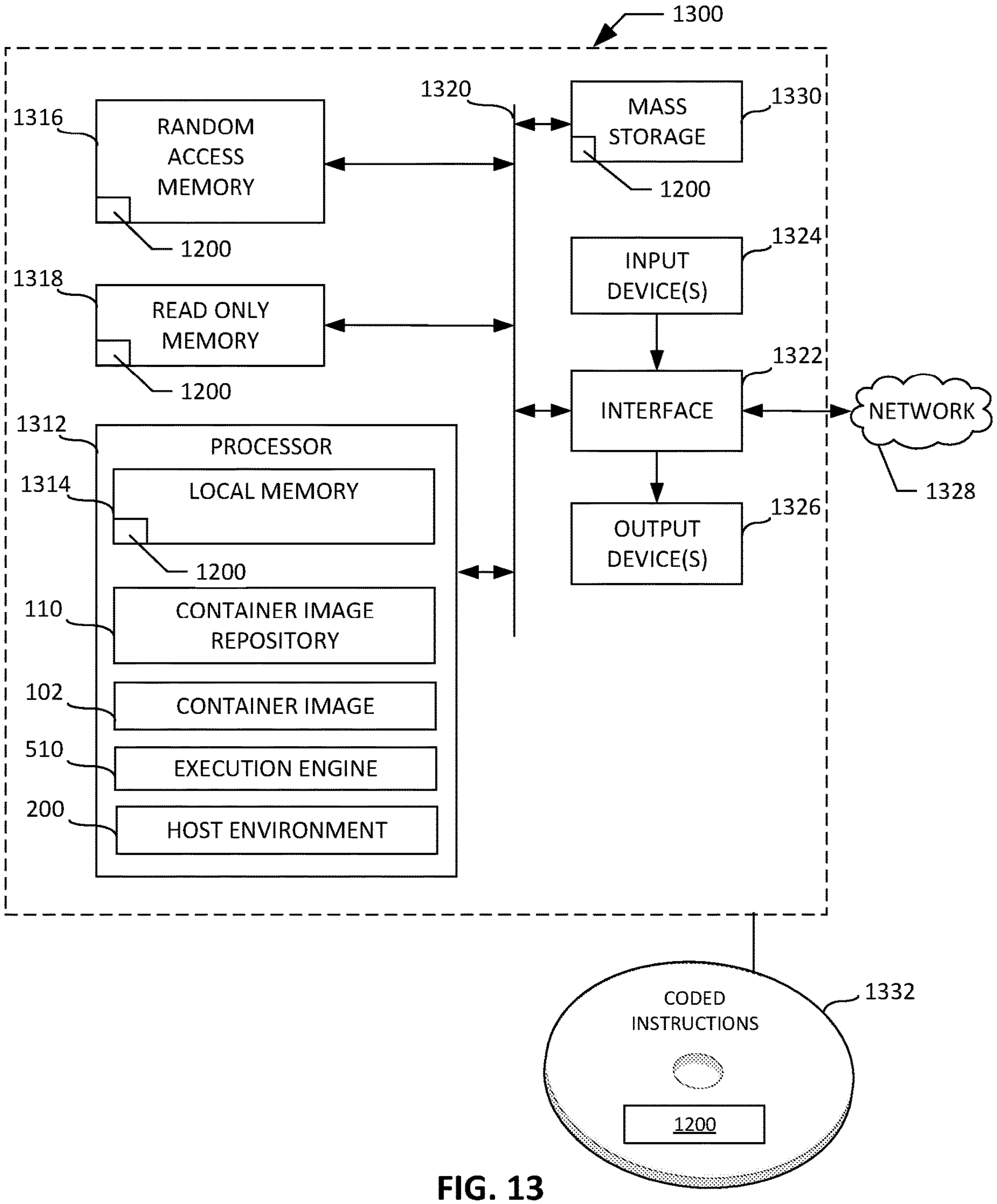
FIGS. 13-14 are block diagrams of example processing platform capable of executing the example instructions of FIG. 12 to implement the example systems and associated sequences of FIGS. 1-11.

FIG. 13 is a block diagram of an example processor platform 1300 capable of executing the instructions of FIG. 12 to implement the example sandbox code execution systems and associated sequences of FIGS. 1-11. The processor platform 1300 can be, for example, a server, a personal computer, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes the example container image 102, container image repository 110, host environment 200, and/or execution engine 510 described above in connection with FIGS. 1-12. The example processor 1312 also includes a local memory 1314 (e.g., a cache). The processor 1312 of the illustrated example is in communication with a main memory including a volatile memory 1316 and a non-volatile memory 1318 via a bus 1320. The volatile memory 1316 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1318 may be implemented by flash memory and/or any other desired type of memory device. Access to the main memory 1316, 1318 is controlled by a memory controller.

The processor platform 1300 of the illustrated example also includes an interface circuit 1322. The interface circuit 1322 may be implemented by any type of interface standard, such as an Ethernet interface, a universal serial bus (USB), and/or a PCI express interface.

In the illustrated example, one or more input devices 1324 are connected to the interface circuit 1322. The input device (s) 1324 permit(s) a user to enter data and commands into the processor 1312. The input device(s) can be implemented by, for example, a keyboard, a mouse, a touchscreen, a track-pad, a trackball, isopoint and/or a voice recognition system.

One or more output devices 1326 are also connected to the interface circuit 1322 of the illustrated example. The output devices 1326 can be implemented, for example, by display devices (e.g., a liquid crystal display, a cathode ray tube display (CRT), a touchscreen, a printer and/or speakers). The interface circuit 1322 of the illustrated example, thus, typically includes a graphics driver card, a graphics driver chip or a graphics driver processor.

The interface circuit 1322 of the illustrated example also includes a communication device such as a transmitter, a receiver, a transceiver, a modem and/or network interface card to facilitate exchange of data with external machines (e.g., computing devices of any kind) via a network 1328 (e.g., an Ethernet connection, a digital subscriber line (DSL), a telephone line, coaxial cable, a cellular telephone system, etc.).

The processor platform 1300 of the illustrated example also includes one or more mass storage devices 1330 for storing software and/or data. Examples of such mass storage devices 1330 include floppy disk drives, hard drive disks, compact disk drives, Blu-ray disk drives, RAID systems, and digital versatile disk (DVD) drives.

The coded instructions 1200 of FIG. 12 may be stored in the mass storage device 1330, in the volatile memory 1316, in the non-volatile memory 1318, and/or on a removable tangible computer readable storage medium 1332 such as a CD or DVD.

Figure 14:
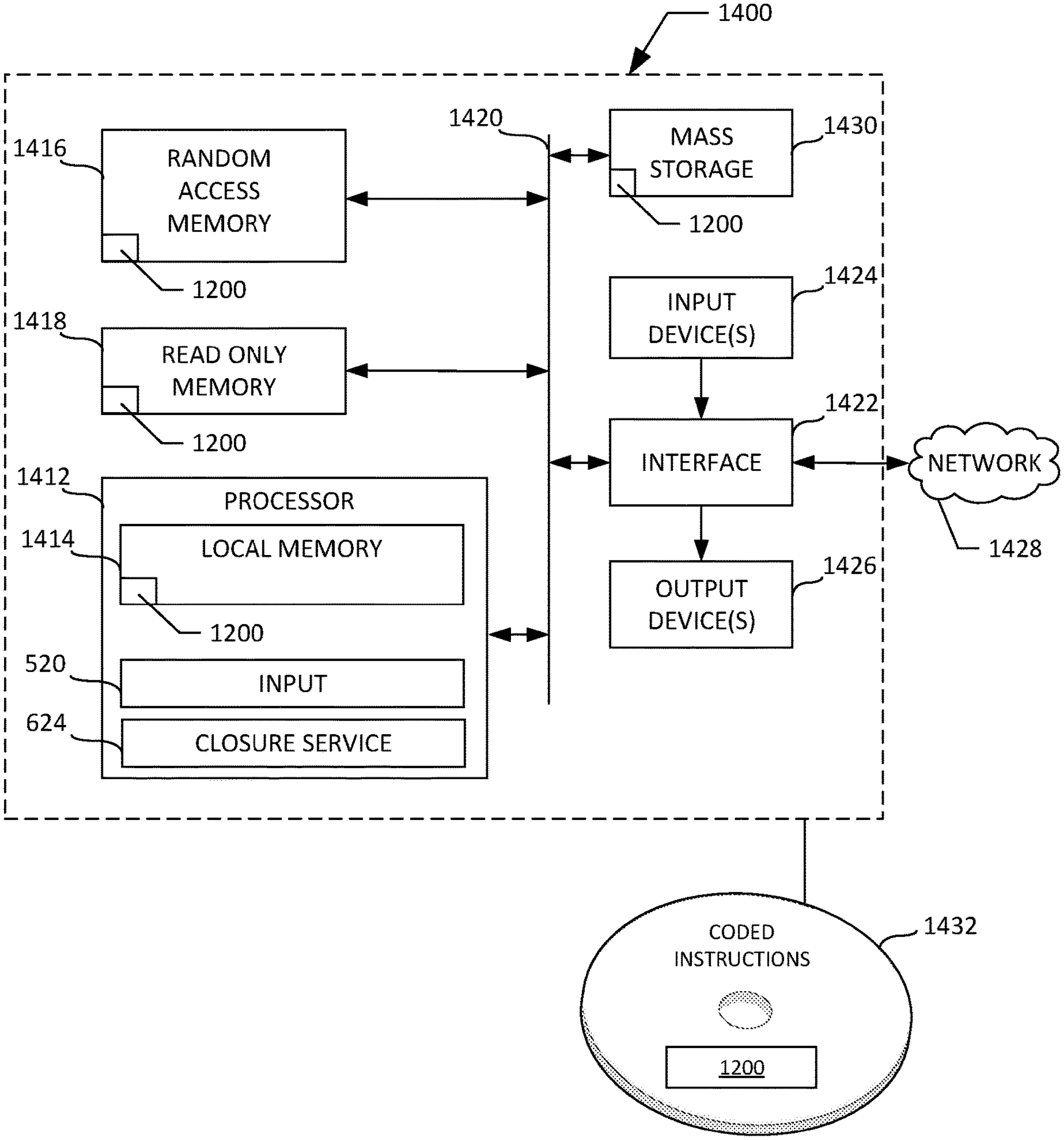

FIG. 14 is a block diagram of an example processor platform 1400 capable of sandboxed code execution systems and sequences of FIGS. 1-11. The processor platform 1400 can be, for example, a server, a personal computer, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer.

The processor 1412 of the illustrated example includes the example input 520 (e.g., including event/scheduling service 618, REST service 620, UI 622, etc.) and closure service 625 described above in connection with FIGS. 1-11. The example processor 1412 also includes a local memory 1414 (e.g., a cache). The processor 1412 of the illustrated example is in communication with a main memory including a volatile memory 1416 and a non-volatile memory 1418 via a bus 1420. The volatile memory 1416 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1418 may be implemented by flash memory and/or any other desired type of memory device. Access to the main memory 1416, 1418 is controlled by a memory controller.

The processor platform 1400 of the illustrated example also includes an interface circuit 1422. The interface circuit 1422 may be implemented by any type of interface standard, such as an Ethernet interface, a universal serial bus (USB), and/or a PCI express interface.

In the illustrated example, one or more input devices 1424 are connected to the interface circuit 1422. The input device (s) 1424 permit(s) a user to enter data and commands into the processor 1412. The input device(s) can be implemented by, for example, a keyboard, a mouse, a touchscreen, a track-pad, a trackball, isopoint and/or a voice recognition system.

One or more output devices 1426 are also connected to the interface circuit 1422 of the illustrated example. The output devices 1426 can be implemented, for example, by display devices (e.g., a liquid crystal display, a cathode ray tube display (CRT), a touchscreen, a printer and/or speakers). The interface circuit 1422 of the illustrated example, thus, typically includes a graphics driver card, a graphics driver chip or a graphics driver processor.

The interface circuit 1422 of the illustrated example also includes a communication device such as a transmitter, a receiver, a transceiver, a modem and/or network interface card to facilitate exchange of data with external machines (e.g., computing devices of any kind) via a network 1428 (e.g., an Ethernet connection, a digital subscriber line (DSL), a telephone line, coaxial cable, a cellular telephone system, etc.).

The processor platform 1400 of the illustrated example also includes one or more mass storage devices 1430 for storing software and/or data. Examples of such mass storage devices 1430 include floppy disk drives, hard drive disks, compact disk drives, Blu-ray disk drives, RAID systems, and digital versatile disk (DVD) drives.

The coded instructions 1200 of FIG. 12 may be stored in the mass storage device 1430, in the volatile memory 1416, in the non-volatile memory 1418, and/or on a removable tangible computer readable storage medium 1432 such as a CD or DVD.

From the foregoing, it will be appreciated that example methods, apparatus and articles of manufacture have been disclosed that provide a sandboxed code execution apparatus in a virtualized environment. The example apparatus includes a closure service to receive a request for execution of code. The example closure service is to generate a closure to trigger execution of the code within the apparatus. The example apparatus includes a container host to form a host environment for a container image. The example container image is to spawn, in response to the closure, a container to execute the code. The example container is to execute the code and keep code execution and result inside the container. Code execution and result inside the container do not affect operation of the apparatus.

Using container-constrained code execution and evaluation of results, scripts can be run without worrying about server configuration, stability, safety, etc. A container host can be established to execute code scripts without using a server. Previously, a server must be allocated and configured to execute code. However, certain examples enable code to be written and executed on a container spawned by the container host. A variety of configurations and/or automations can be supported to execute Java code, PowerShell script, Python code, etc., to implement a variety of functions without fear of corrupting or otherwise affecting system operation if code is incorrect, corrupted, and/or otherwise erroneous since execution occurs sandboxed within a container, for example.

Certain examples provide a method for sandboxed code execution apparatus in a virtualized environment. The example method includes generating, using a closure service, a closure based on receipt of a request for execution of code, the closure to trigger execution of the code. The example method includes spawning, in response to the closure, a container from a container image in a container host. The example method includes executing the code in the container, the container keeping the executing of the code and results inside the container, wherein executing the code and result inside the container do not affect operation outside the container. The example method includes populating results upon completion of executing the code.

Certain examples provide a computer readable storage medium including instructions which, when executed, cause a processor to form a sandboxed code execution apparatus in a virtualized environment. The example apparatus includes a closure service to receive a request for execution of code. The example closure service is to generate a closure to trigger execution of the code within the apparatus. The example apparatus includes a container host to form a host environment for a container image. The example container image is to spawn, in response to the closure, a container to execute the code. The example container is to execute the code and keep code execution and result inside the container. Example code execution and result inside the container do not affect operation of the apparatus.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A sandboxed code execution apparatus in a virtualized environment, the apparatus comprising:

- a closure service to receive a request for execution of code, the closure service to generate a closure to trigger execution of the code within the apparatus; and
- a container host to form a host environment for a container image, the container image to spawn, in response to the closure, a container to execute the code, the container to execute the code and keep code execution and a result of the code execution inside the container, the result populated from the container host to the closure service for access by a client service, wherein the code execution and the result inside the container do not affect operation of the apparatus outside the host environment.

2. The apparatus of claim 1, wherein the client service includes a representational state transfer (REST) service to provide the request to the closure service and to receive the result of the code execution via the closure service.

3. The apparatus of claim 2, further including a scheduling service to provide input to the REST service and receive output from the REST service.

4. The apparatus of claim 1, wherein the closure includes a plurality of states including created, started, failed, and finished.

5. The apparatus of claim 1, wherein the container is to inform the closure that code execution has begun and is to populate the result when code execution has completed.

6. The apparatus of claim 1, wherein the result of the code execution is to be provided via a uniform resource indicator callback.

7. The apparatus of claim 1, wherein the code to be executed in the container is to be fetched by the container from externally hosted source code.

8. A method for sandboxed code execution apparatus in a virtualized environment, the method comprising:

- generating, using a closure service, a closure based on a request for execution of code, the closure to trigger execution of the code; and
- spawning, in response to the closure, a container from a container image in a container host;
- executing the code in the container, the container keeping the executing of the code and a result of the code execution inside the container, wherein executing the code and result inside the container do not affect operation outside the container; and
- populating results from the container host to the closure service for access by a client service upon completion of executing the code.

9. The method of claim 8, wherein the client service is a representational state transfer (REST) service, and further including providing the request to the closure service via the REST service and receiving the result of executing the code via the closure service.

10. The method of claim 9, wherein a scheduling service is to provide input to the REST service and receive output from the REST service.

11. The method of claim 8, wherein the closure includes a plurality of states including created, started, failed, and finished.

12. The method of claim 8, further including informing the closure, via the container, that code execution has begun and populating the result when code execution has completed.

13. The method of claim 8, wherein the result of the code execution is to be provided via a uniform resource indicator callback.

14. The method of claim 8, further including fetching, by the container, the code to be executed in the container from externally hosted source code.

15. A computer readable storage medium including instructions which, when executed, cause a processor to implement a sandboxed code execution apparatus in a virtualized environment, the apparatus comprising:

- a closure service to receive a request for execution of code, the closure service to generate a closure to trigger execution of the code within the apparatus; and
- a container host to form a host environment for a container image, the container image to spawn, in response to the closure, a container to execute the code, the container to execute the code and keep code execution and a result of the code execution inside the container, the result populated from the container host to the closure service for access by a client service, wherein the code execution and the result inside the container do not affect operation of the apparatus outside the host environment.

16. The computer readable storage medium of claim 15, wherein the client service includes a representational state transfer (REST) service, and wherein the instructions, when executed, further cause the processor to implement the REST service to provide the request to the closure service and to receive the result of the code execution via the closure service.

17. The computer readable storage medium of claim 16, wherein the instructions, when executed, further cause the processor to implement a scheduling service to provide input to the REST service and receive output from the REST service.

18. The computer readable storage medium of claim 15, wherein the closure includes a plurality of states including created, started, failed, and finished.

19. The computer readable storage medium of claim 15, wherein the container is to inform the closure that code execution has begun and is to populate the result when code execution has completed.

20. The computer readable storage medium of claim 15, wherein the result of the code execution is to be provided via a uniform resource indicator callback.

21. The computer readable storage medium of claim 15, wherein code to be executed in the container is to be fetched by the container from externally hosted source code.

* * * * *